US009190865B2

(12) United States Patent
Winget et al.

(10) Patent No.: US 9,190,865 B2
(45) Date of Patent: Nov. 17, 2015

(54) AUTOMOTIVE VEHICLE INTERIOR PLASTIC PART HAVING A SUPPORT SURFACE CAPABLE OF WIRELESSLY SUPPLYING ELECTRICAL POWER (75) Inventors: Larry J. Winget, Leonard, MI (US); Darius J. Preisler, Macomb, MI (US); Christopher A. Heikkila, Washington Township, MI (US); Jason T. Murar, Macomb, MI (US)

(73) Assignee: GLOBAL IP HOLDINGS, LLC, Sterling Heights, MI (US)

( * ) Notice: Subject to any disclaimer, the term of this patent is extended or adjusted under 35 U.S.C. 154(b) by 574 days.

(21) Appl. No.: 13/438,335

(22) Filed: Apr. 3, 2012

(65) Prior Publication Data

US 2013/0260610 A1  Oct. 3, 2013

(51) Int. Cl.
| | |
|---|---|
| *B60L 1/00* | (2006.01) |
| *B60L 3/00* | (2006.01) |
| *H02G 3/00* | (2006.01) |
| *H02J 7/02* | (2006.01) |
| *B60R 1/00* | (2006.01) |

(52) U.S. Cl.
CPC .. *H02J 7/025* (2013.01); *B60R 1/00* (2013.01)

(58) Field of Classification Search
CPC .................................. H02J 7/025; B60R 1/00
USPC ........................... 307/104, 9.1, 10.1; 439/626
See application file for complete search history.

(56) References Cited

U.S. PATENT DOCUMENTS

| | | | |
|---|---|---|---|
| 3,205,618 A | 9/1965 | Heytow | |
| 3,978,934 A | 9/1976 | Schneidinger | |
| 4,324,301 A | 4/1982 | Eyerly | |
| 5,868,076 A | 2/1999 | Myus et al. | |
| 5,977,489 A * | 11/1999 | Crotzer et al. | ................ 174/257 |
| 6,044,767 A | 4/2000 | Myus et al. | |
| 6,180,221 B1 * | 1/2001 | Crotzer et al. | ............. 428/317.9 |
| 6,475,937 B1 | 11/2002 | Preisler et al. | |
| 6,917,182 B2 | 7/2005 | Burton et al. | |
| 7,065,658 B1 | 6/2006 | Baraban et al. | |
| 7,116,215 B2 * | 10/2006 | Oonishi | ........................ 340/436 |
| 7,172,196 B2 | 2/2007 | Randall | |
| 7,399,202 B2 | 7/2008 | Dayan et al. | |

(Continued)

OTHER PUBLICATIONS

Office Action; corresponding U.S. Appl. No. 13/438,335; notification date Mar. 20, 2015.

(Continued)

*Primary Examiner* — Jared Fureman
*Assistant Examiner* — James P Evans
(74) *Attorney, Agent, or Firm* — Brooks Kushman P.C.

(57) ABSTRACT

An automotive vehicle interior plastic part having a vibration and shock damping support surface capable of wirelessly supplying electrical power to a supported electronic device during vehicle motion is provided. A part of the surface includes first and second sets of conductive, anti-vibration and anti-shock thermoplastic pads. Another part of the surface includes a non-conductive or insulating, unitary, anti-vibration and anti-shock plastic substrate bonded to the different sets of pads. The substrate electrically insulates the first set of pads from the second set of pads. A power source coupling includes first and second conductive power traces. The first trace is electrically coupled to each of the first set of pads and the second trace is electrically coupled to each of the second set of pads. The first and second traces form separate conductive pathways and are operable for biasing the different sets of pads at different voltage levels.

20 Claims, 5 Drawing Sheets

(56) References Cited

U.S. PATENT DOCUMENTS

| | | | |
|---|---|---|---|
| 7,417,197 B2 * | 8/2008 | Kent et al. | 174/261 |
| 7,654,683 B2 | 2/2010 | Ellis | |
| 7,932,638 B2 | 4/2011 | Randall | |
| 7,952,320 B2 | 5/2011 | Bersenev | |
| 7,982,436 B2 | 7/2011 | Randall | |
| 7,986,059 B2 | 7/2011 | Randall | |
| 8,081,408 B2 | 12/2011 | Randall | |
| 8,235,826 B2 | 8/2012 | Randall | |
| 2005/0162133 A1 | 7/2005 | Aisenbrey | |
| 2006/0066088 A1 | 3/2006 | Hier et al. | |
| 2010/0156197 A1 | 6/2010 | Randall | |
| 2011/0006611 A1 * | 1/2011 | Baarman et al. | 307/104 |
| 2011/0084655 A1 | 4/2011 | Hui et al. | |
| 2011/0128686 A1 | 6/2011 | Moreshead | |
| 2011/0227527 A1 | 9/2011 | Zhu et al. | |
| 2011/0241608 A1 | 10/2011 | Adamczyk et al. | |
| 2013/0333941 A1 | 12/2013 | Snider | |

OTHER PUBLICATIONS

Office Action; corresponding U.S. Appl. No. 13/526,855; notification date Mar. 27, 2015.

Office Action; corresponding U.S. Appl. No. 14/050,513; notification date Apr. 14, 2015.

Office Action; corresponding U.S. Appl. No. 13/832,124; notification date Apr. 27, 2015.

* cited by examiner

AUTOMOTIVE VEHICLE INTERIOR PLASTIC PART HAVING A SUPPORT SURFACE CAPABLE OF WIRELESSLY SUPPLYING ELECTRICAL POWER

TECHNICAL FIELD

This invention relates, in general, to automotive vehicle interior plastic parts having support surfaces capable of wirelessly supplying electrical power and, in particular, to automotive vehicle interior plastic parts having support surfaces capable of wirelessly supplying electrical power to portable or mobile electrically-powered electronic devices supported on the support surfaces during vehicle motion.

OVERVIEW

Automotive interior plastic parts must satisfy a wide variety of environmental and safety regulations including the need for such parts to be recyclable. Because of the potentially large volume of automotive vehicles that are produced year after year, automotive interior parts must be produced in a cost-effective fashion without the need for elaborate and costly manufacturing facilities.

The proliferation of portable or mobile, re-chargeable battery powered electronic devices of many types and varieties is virtually boundless, due in large part to better and smaller rechargeable batteries, wireless communications and data transfer capabilities, and other capabilities and features that have made such electronic devices convenient and affordable. Consequently, many people have and use not just one, but a number of different electronic devices, for example, mobile phones (in FIG. 2), music players, notebook computers, laptop computers, personal digital assistants, cameras, GPS position locators, hearing aids, flash lights, and many others, all of which need to be recharged from time to time.

Power supply pads with power supply contact surfaces on which a variety of such electronic devices equipped with conduction contacts can be positioned alone or along with others to receive recharging power wirelessly or in a wire-free manner, i.e., without wires or plugs between the power supply surfaces of the power delivery pads or contacts and the power receiver contacts on the mobile electronic or electrically-powered electronic devices.

There are a number of problems affecting the passage of current between contact surfaces such as:

surface finish; wear; arc erosion; contamination; oxidation; silicone contamination; frettage and frottage corrosion; and contact bounce.

Many of the above-noted problems result in a reduction in electrical contact area which increases electrical resistance and results in much higher operating temperatures at the contact surfaces causing inefficient operation and damage to the contacts themselves.

An uneven contact surface will wear on the contact areas. Debris from abrasion and erosion will collect in any cavity in the contact areas, oxidize, and further reduce contact surface area and increase abrasion.

An attribute of some of the wire-free conductive power delivery systems includes combinations of power delivery pad configurations and power receiver contact configurations that ensure wire-free power transfer from the power pads to the electronic devices, regardless of the location or orientation at which the mobile electronic device with its power receiver contacts may be positioned on the power delivery pad. For example, for a power delivery pad with an array of square power surfaces, each one being opposite in polarity to each laterally adjacent power surface, a power receiver contact configuration or constellation comprising at least five contacts equally spaced in a circle (pentagon configuration) of appropriate size in relation to the square power surfaces.

In another example, for a power delivery pad with an array of elongated, parallel power surfaces or strips, each one of which is opposite in polarity to each adjacent strip, a power receiver contact configuration or constellation comprising at least four contacts, three of which are at points of an equilateral triangle and the fourth of which is at the center of the equilateral triangle of appropriate size in relation to the elongated rectangular power surfaces, can ensure power transfer, regardless of location or orientation of the constellation of power receiver contacts on the power delivery pad.

Figure 2:
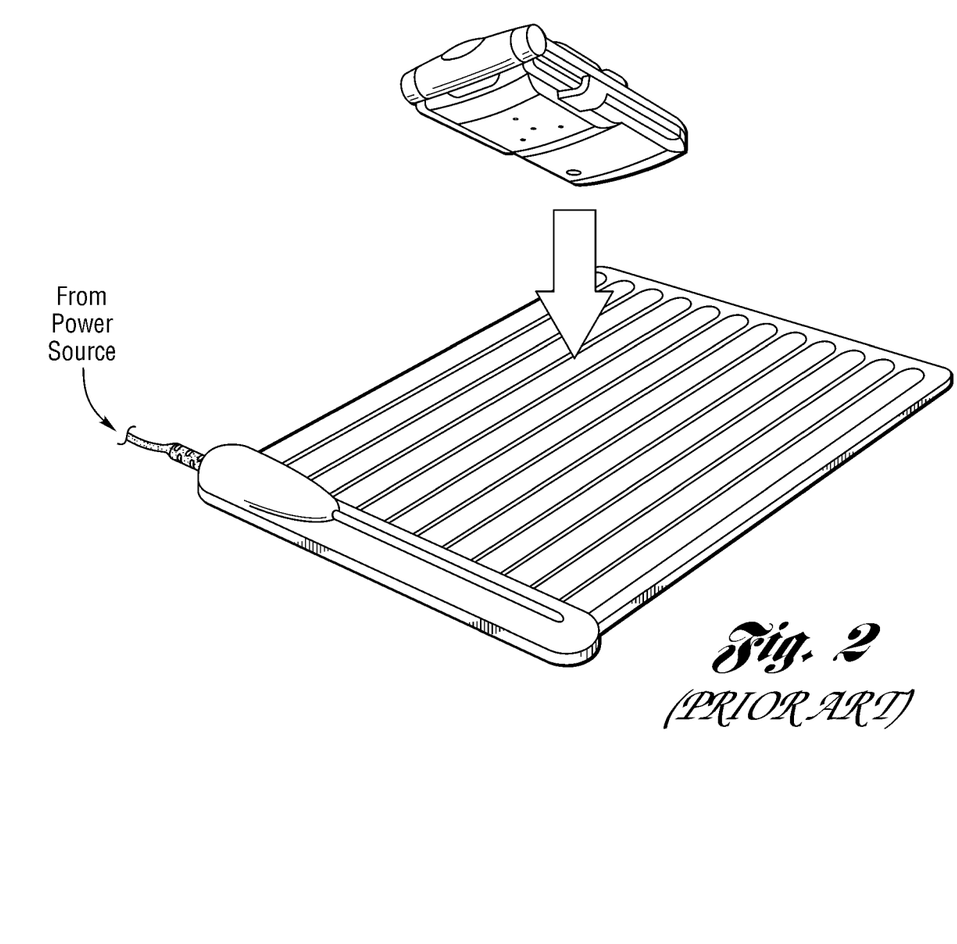
FIG. 2 is a perspective view, partially broken away, of a prior art charging pad, which includes a power delivery support surface, and an electronic device to be charged shown above the power delivery support surface.

An example prior art charging pad and enabled power receiving device are shown in FIG. 2. The charging pad transfers power wirelessly or wire-free, i.e., without a charging adapter cord, to one or more devices resting on it. In this context, the terms "wireless", "wirelessly", and "wire-free" are used to indicate that charging of the device is achieved without a cord-type electric charging unit or adapter, and in the example of FIG. 2, is achieved with through electrical conduction through contacts with selective geometry. Wireless in this context can be interfacing contacts as will be explained below. Also, the term "enabled" device is used for convenience to mean an electronic or electrically powered device, for example, cell phone, computer, radio, camera, personal digital assistant, digital recorder and playback device, hearing aid, GPS receiver or transmitter, medical instrument, or just about any other portable device, that is equipped with charging contacts and associated electronic circuitry to enable the device to be electrically charged by the power pad component.

The top surface of the charging pad may comprise an array of contact strips which are energized with low voltage DC or AC or grounded so that every other strip is at a different voltage, e.g., one set of strips are positive and the strips in-between the positive strips are negative or ground potential, or vice versa.

On the underside of one example enabled device there are a plurality of conduction contact points arranged in a "constellation" configuration or pattern. One example constellation pattern comprises four contacts arranged with three of the contacts defining the vertices of an equilateral triangle and the fourth contact in the middle of the equilateral triangle. This pattern is sometimes referred to as a tetrahedron pattern because the four contacts are positioned as the vertices of a tetrahedron would appear in a top plan view of a tetrahedron.

The contact constellation on the enabled device of FIG. 2 and the contact strip array on the charging pad form a geometrically complementary pair with the property that electrical power can be transferred from the pad into the device regardless of the position and orientation of each particular device on the pad. The particular number, geometric size, and arrangement of the contacts is not the subject of this invention. Suffice it to say that they can be sized, arranged, and shaped to transfer power from the power delivery surface of the charging pad to an enabled charge receiving device.

With appropriate sizing, no matter where or at which orientation the constellation is set on the pad, at least one positive and one negative contact will be made, thus electrical power can be transferred from the pad to the enabled device. Power can be extracted from the contacts using a rectifier, the output of which is approximately equal to the electrical potential between contract strips or pads of the power delivery surface after allowing for some losses in the rectifier circuit. The rectifier can be a bridge rectifier enabled with diodes (not shown) that also inherently prevents the exposed contacts on the mobile or enabled device from being "live" when they are separated or removed from the charging pad. In other words, the diodes in the rectifier between the contacts on the enabled device and the rechargeable battery or capacitor in the enabled device prevents electric current from flowing from the rechargeable battery or capacitor of the device to the contacts.

In this architecture, the voltage on the power delivery surface of the charging pad is fixed and independent of the devices resting on the pad surface. Each individual device that gets positioned on the charging pad is responsible for conditioning the electric power obtained from the charging pad to power that is appropriate for its own use. This scheme inherently allows for multiple devices of various manufacturers with various power requirements to be charged from the same charging pad.

The following prior art U.S. patent documents are related to the present invention: U.S. Pat. Nos. 6,917,182; 7,065,658; 7,399,202; 7,654,683; 7,952,320; 7,986,059; 2005/0162133; 2010/0156197; 2011/0084655; 2011/0128686; 2011/0227527; and 2011/0241608.

There are a number of problems associated with the above-noted prior art especially if the disclosed power pads are to be used in an automotive interior environment. For example, automotive interior parts can experience wide temperature swings, and are subject to shock and vibration not normally experienced in a controlled home or office environment. Also, objects supported on generally horizontal support surfaces of automotive interior parts experienced various forces (i.e., acceleration, deceleration and/or centrifugal) which urge the objects to shift, slide or roll on the support surfaces in response to the motion of the vehicle.

SUMMARY OF EXAMPLE EMBODIMENTS

An object of at least one embodiment of the present invention is to provide an automotive vehicle interior plastic part which not only dampens vibration and shock at its support surface but also wirelessly provides electrical power for portable or mobile electrically-powered electronic devices during vehicle movement.

Another object of at least one embodiment of the present invention is to provide an automotive vehicle interior plastic part which not only provides an anti-shock and anti-vibration support surface but also wirelessly provides electrical power for portable or mobile electrically-powered electronic devices during vehicle movement.

In one embodiment, an automotive vehicle interior plastic part having an anti-vibration and anti-shock support surface capable of supplying electrical power to an electrically-powered electronic device supported on the surface is provided. The part including first and second sets of conductive, anti-vibration and anti-shock thermoplastic pads that comprise a first part of the support surface. The part also includes a non-conductive or insulating unitary anti-vibration and anti-shock plastic substrate bonded to the first and second sets of pads and comprising a second part of the support surface. The substrate electrically insulates the first set of pads from the second set of pads. The pads and substrate dampen vibration and shock at the support surface and allow power transfer during vehicle motion. The part further includes a power source coupling having first and second conductive power traces. The first trace is electrically coupled to each of the first set of pads and the second trace is electrically coupled to each of the second set of pads. The first and second traces form separate conductive pathways and are operable for biasing the first and second sets of pads at first and second voltage levels, respectively.

In another embodiment, an automotive vehicle interior plastic part having an anti-vibration and anti-shock support surface capable of supplying electrical power to an electrically-powered electronic device supported on the surface is provided. The part includes first and second sets of conductive, thermoplastic elastomer pads that comprise a first part of the support surface. The part also includes a non-conductive or insulating unitary thermoplastic elastomer substrate chemically bonded to the first and second sets of pads and comprising a second part of the support surface. The substrate electrically insulates the first set of pads from the second set of pads. The pads and substrate dampen vibration and shock at the support surface and allow power transfer during vehicle motion. The part further includes a power source coupling including first and second conductive power traces. The first trace is electrically coupled to each of the first set of pads and the second trace is electrically coupled to each of the second set of pads. The first and second traces form separate conductive pathways and are operable for biasing the first and second sets of pads at first and second voltage levels, respectively.

The first and second sets of pads may be sized, shaped and arranged laterally adjacent to each other in a pattern at the support surface in relation to a predetermined distribution of contacts of the device to achieve conductive power transfer to the device at various positions and orientations of the device when supported on the support surface.

The part may include a first common conductive pad for coupling the first set of pads together and a second common conductive pad for coupling the second set of pads together.

The first common conductive pad and the first set of pads may form a first integral, unitary, conductive structure and the second common conductive pad and the second set of pads may form a second integral, unitary, conductive structure.

The first and second conductive structures may be substantially identical.

The first set of pads may be interdigitated with the second set of pads.

The first and second conductive power traces may be substantially identical.

The first conductive power trace may include a first set of finger portions, and the second conductive power trace may include a second set of finger portions wherein the first and second finger portions may be interdigitated.

Other technical advantages will be readily apparent to one skilled in the art from the following figures, descriptions and claims. Moreover, while specific advantages have been enumerated, various embodiments may include all, some or none of the enumerated advantages.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
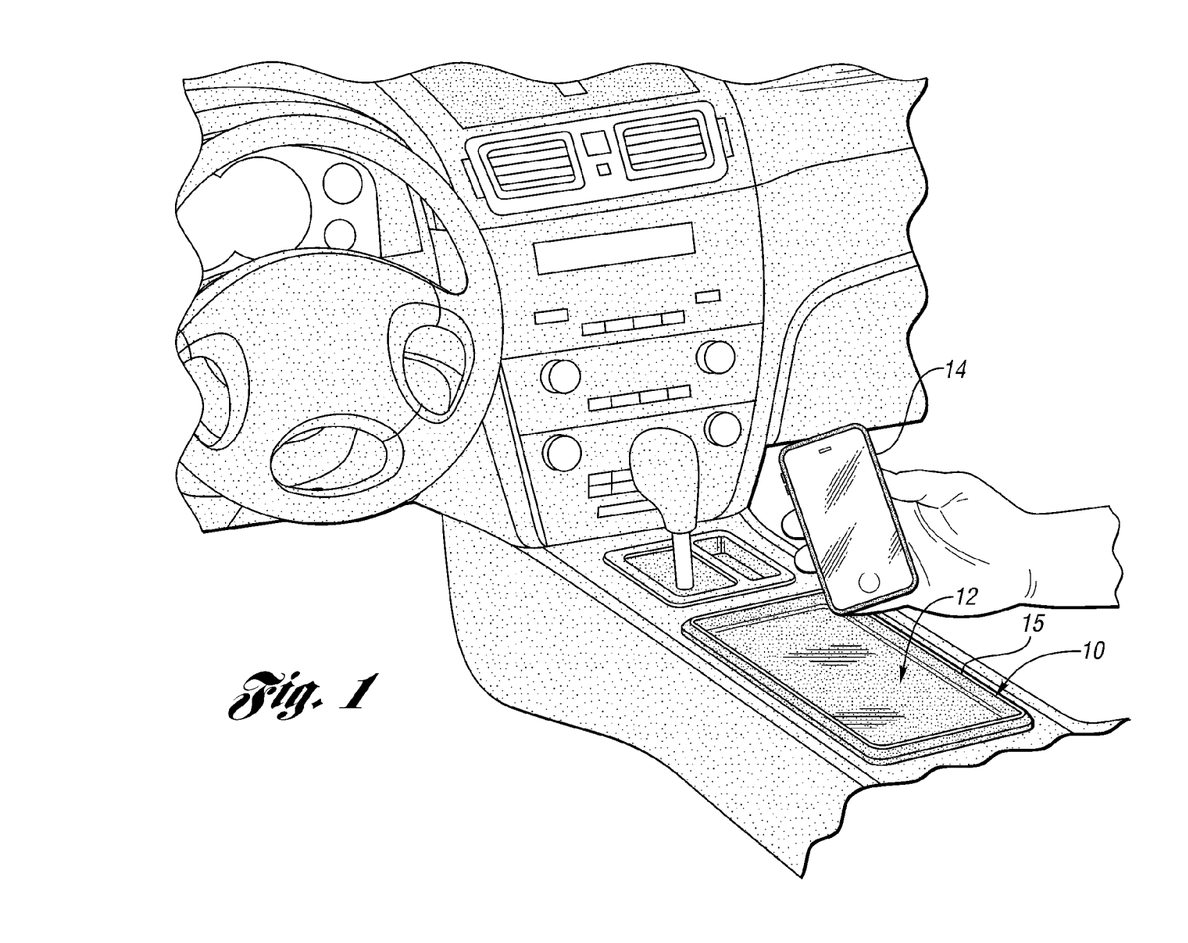
FIG. 1 is an environmental view, partially broken away, of an automotive vehicle interior including a plastic part constructed in accordance with at least one embodiment of the present invention.

Referring now to FIG. 1, an automotive vehicle interior plastic part constructed in accordance with at least one embodiment of the present invention is generally included at 10. The part 10 includes an anti-vibration and anti-shock support surface, generally indicated at 12, capable of supplying electrical power to an electrically-powered device 14 when the device 14 is supported on the surface 12 and the vehicle is either at rest or in motion. The part 10 also has an upwardly extending outer peripheral wall portion 15 which is integrally formed with and about the support surface 12.

Figure 3:
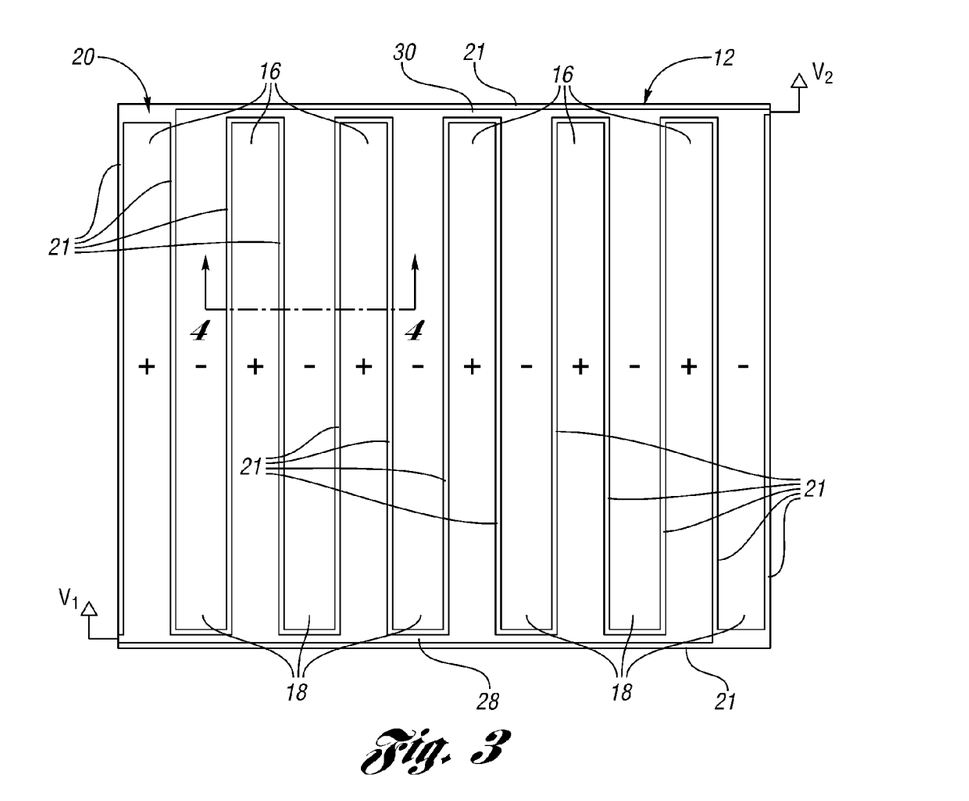
FIG. 3 is a top plan schematic view of a support charging surface of the plastic part of FIG. 1 showing alternating interdigitated positively and negatively (or grounded) charged pads and a non-conductive or insulating plastic framework which is chemically bonded to and electrically separates the pads.
Figure 4:
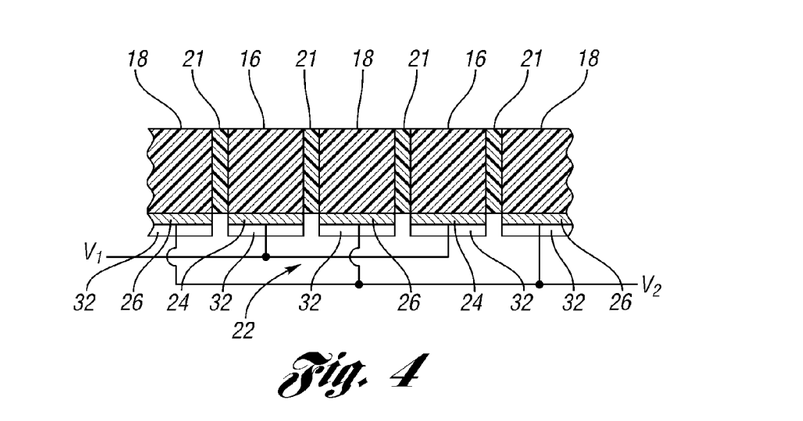
FIG. 4 is a view, partially broken away and in cross section, taken along lines 4-4 of FIG. 3 and showing first and second electrically conductive traces formed on the bottom surfaces of the pads to provide conductive pathways to and from the pads.
Figure 5:
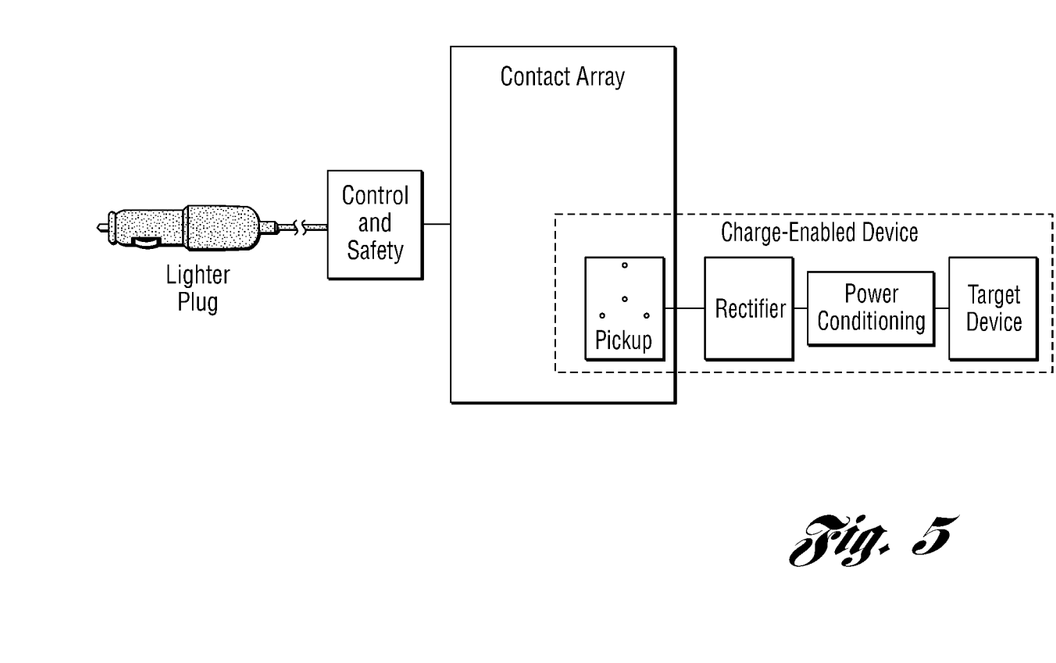
FIG. 5 is a schematic block diagram, partially broken away, of a charging system including a prior art charge-enabled device and further including the contact array of plastic part of FIG. 1, electrically coupled to a plug such as a lighter plug which can be inserted into an automotive interior DC power outlet to provide electrical power to the support surface of the part.

Referring now to FIGS. 3 and 4, the part 10 includes first and second sets of conductive anti-vibration and anti-shock thermoplastic pads 16 and 18, respectively, that comprise a first part of the support surface 12. The pads 16 and 18 are preferably made of a conductive thermoplastic elastomer (TPE). However, other types of conductive thermoplastic which have anti-vibration anti-shock properties while allowing the surface 12 to supply or transfer electrical power to supported devices during vehicle motion may be used instead of TPE.

The part 12 also includes a non-conductive or insulating unitary, anti-vibration and anti-shock plastic substrate, generally indicated at 20, chemically bonded to the first and second sets of pads 16 and 18, respectively, and comprising a second part of the anti-vibration and anti-shock support surface 12. The substrate 20 includes a plurality of interconnected, non-conductive or insulating strip portions 21. The portions 21 of the substrate 20 electrically insulate the first set of pads 16 from the second set of pads 18 and are preferably made of a non-conductive thermoplastic elastomer (TPE). However, other types of non-conductive thermoplastic having anti-vibration and anti-shock properties may be used.

The part 10 also includes a power source coupling, generally indicated at 22 in FIG. 4, including first and second conductive power traces 24 and 26, respectively. The first trace 24 is electrically coupled to each of the first set of pads 16 and the second trace 26 is electrically coupled to each of the second set of pads 18. The first and second traces 24 and 26, respectively, form separate conductive pathways and are operable for biasing the first and second sets of pads 16 and 18, respectively, at first and second voltage levels, respectively. The first voltage level may be a positive voltage level and the second voltage level may be a positive voltage level less than the first voltage level, a ground voltage level, or a negative voltage level.

The first and second sets of pads 16 and 18, respectively, are sized, shaped and arranged laterally adjacent to each other in a pattern at the support surface 12 in relation to a predetermined distribution of contacts of the device 14 to achieve conductive power transfer to the device 14 at various positions and orientations of the device 14 when supported on the support surface 12 while the vehicle is at rest or in motion.

The part 10 includes a first common conductive plastic (i.e., TPE) pad 28 (FIG. 3) for coupling the first set of pads 16 together. The part 10 also includes a second common conductive plastic (i.e., TPE) pad 30 (FIG. 3) for coupling the second set of pads 18 together.

The first common conductive pad 28 and the first set of pads 16 form a first integral, unitary, conductive structure and the second common conductive pad 30 and the second set of pads 18 form a second integral, unitary, conductive structure. The first and second conductive structures are substantially identical as shown in FIG. 3. Also, as shown in FIG. 3, the first set of pads 16 are interdigitated with the second set of pads 18.

The first and second conductive power traces 24 and 26, respectively, are substantially identical in plan view to their respective pads 16 and 28, 18 and 30, respectively, since they preferably completely cover the bottom surfaces of their respective pads 16 and 28, 18 and 30. Consequently, the first conductive power trace 24 includes a first set of finger portions, and the second conductive power trace 26 includes a second set of finger portions which are interdigitated with the first set of finger portions.

Thermoplastic elastomers (TPEs) are a class of polymers that behave like thermoset rubber but that, above their melt or softening temperatures, are melt processable via thermoplastic processing methods and can be easily reprocessed and remolded. The ability to process these materials with thermoplastic methods allows for design and fabrication freedom.

Bondable thermoplastic elastomer compounds may be formulated to provide a chemical bond to plastic substrates, such as TPE substrates, making possible simpler part designs that are less dependent on mechanical interlocks or require time consuming surface preparation during production.

These compounds are compatible with insert or multi-shot molding methods and are ideal for applications where a "soft-touch" feature can provide an ergonomic touch or enhance consumer appeal, dampen sound or vibration, or provide impact or shock protection. Also, such compounds are elastic.

A thermoplastic elastomer (TPE) of at least one embodiment of the present invention may be selected from the group consisting of a thermoplastic polyolefin, thermoplastic urethane, polyester, polycarbonate, acrylonitrile/butadiene/styrene ("ABS"), polypropylene, lomod, bexloy, mixture of acrylonitrile/butadiene/styrene (i.e., ABS) and polycarbonate, and mixtures thereof.

Conductive plastic compounds such as TPEs of at least one embodiment of the present invention have a number of advantages over metals or surfactant coatings. Finished parts are lighter in weight, easier to handle, and less costly to ship. Their fabrication is usually easier and less expensive due to the elimination of secondary processes, and they are not subject to denting, chipping and scratching.

Conductive compounds can be colored for aesthetic purposes, eliminating the need for secondary color processes, such as painting.

The conductive loaded resin-based material of at least one embodiment of the present invention may include micron conductive powder(s), conductive fiber(s), or a combination of conductive powder and conductive fibers in a base resin host. The percentage by weight of the conductive powder(s), conductive fiber(s), carbon nanotubes, or a combination thereof may be between about 20% and 50% of the weight of the conductive loaded resin-based material. The micron conductive powders may be formed with non-metals, such as carbon, graphite, that may also be metallic plated, or the like, or from metals such as stainless steel, nickel, copper, silver, that may also be metallic plates, or the like, or from a combination of non-metal, plated, or in combination with, metal powders. The micron conductor fibers preferably are of nickel-plated carbon or graphite fiber, stainless steel fiber, copper fiber, silver fiber, aluminum fiber, or the like.

The traces 24 and 26 may be formed on the lower surfaces of the pads 16, 18, 28 and 30 by initially bonding a layer of elemental metal such as copper over the entire lower surfaces of the pads 16, 18, 28 and 30 and the substrate 20 then removing unwanted copper (i.e., from the bottom of the substrate 20) after applying a temporary mask (e.g., by etching), leaving only the desired copper traces 24 and 26. Alternatively, the traces 24 and 26 can be added to the lower surfaces of the pads 16, 18, 28 and 30 by multiple electroplating steps.

Removing the copper can be performed by a silk screen printing technique which uses etch-resistant inks to protect the copper foil. Subsequent etching removes the unwanted copper from the substrate 20. Alternatively, the ink may be conductive and printed on the pads 16, 18, 28 and 30.

The pads 16, 18, 28 and 30 may be plated with solder, tin, or gold over nickel as a resist for etching away the unneeded underlying copper from the substrate 20.

After the pads 16, 18, 28 and 30 are etched and then rinsed with water, a soldermask may be applied, and then any exposed copper is coated with solder, nickel/gold, or some other anti-corrosion coating 32 (FIG. 4).

The dimensions of the conductors or traces 24 and 26 on the pads 16, 18, 28 and 30 are related to the amount of current the traces 24 and 26 must carry. Each of the traces 24 and 26 preferably comprises a flat, narrow portion of copper foil that remains after etching. Signal traces are usually narrower than power or ground traces because of their current carrying requirements. One entire return trace may be mostly solid copper to act as a ground plane for power return.

Figure 6:
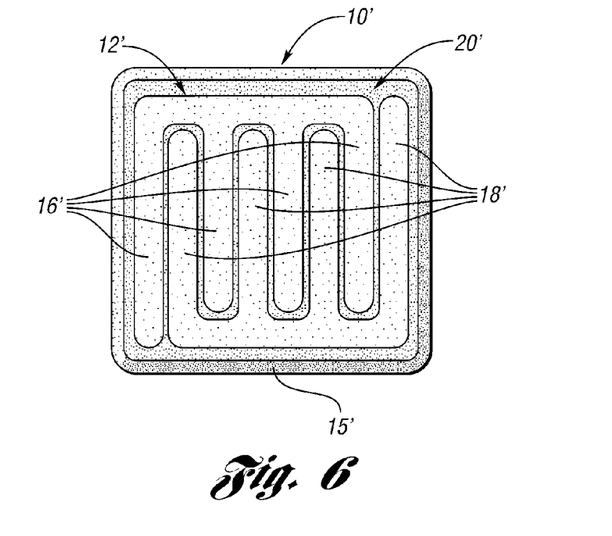
FIG. 6 is a top plan view of an automotive vehicle interior plastic part constructed in accordance with a second embodiment of the present invention.
Figure 7:
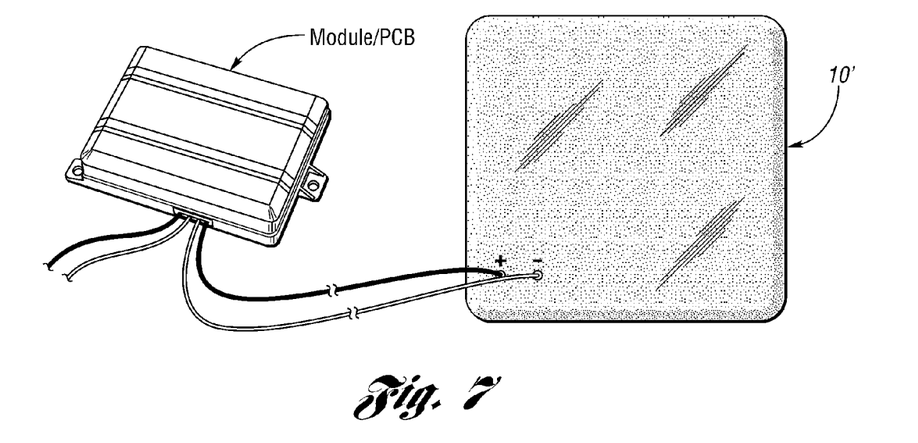
FIG. 7 is a bottom view of the part of FIG. 6 electrically connected to a module/pcb of a charging system.

FIGS. 6 and 7 are top and bottom views, respectively, of an automotive interior plastic part 10' constructed in accordance with a second embodiment of the present invention. Parts on portions of the part 10' which are the same or similar in either structure or function to the part 10 have the same reference numbers and a single prime designation. FIG. 7 shows a bottom view of the part 10' electrically interconnected to a module/PCB which together with the part 10' forms a charging system.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. An automotive vehicle interior plastic part having an anti-vibration and anti-shock support surface capable of wirelessly supplying electrical power to an electrically-powered electronic device supported on the surface, the part comprising:
   first and second sets of conductive, anti-vibration and anti-shock thermoplastic pads that comprise a first part of the support surface;
   a non-conductive or insulating unitary anti-vibration and anti-shock plastic substrate bonded to the first and second sets of pads and comprising a second part of the support surface, the substrate electrically insulating the first set of pads from the second set of pads and wherein the pads and substrate dampen vibration and shock at the support surface and allow power transfer during vehicle motion; and
   a power source coupling including first and second conductive power traces, the first trace being electrically coupled to each of the first set of pads and the second trace being electrically coupled to each of the second set of pads, the first and second traces forming separate conductive pathways and being operable for biasing the first and second sets of pads at first and second voltage levels, respectively.

2. The part as claimed in claim 1, wherein the first and second sets of pads are sized, shaped and arranged laterally adjacent to each other in a pattern at the support surface in relation to a predetermined distribution of contacts of the device to achieve conductive power transfer to the device at various positions and orientations of the device when supported on the support surface.

3. The part as claimed in claim 1, further comprising a first common conductive pad for coupling the first set of pads together.

4. The part as claimed in claim 3, further comprising a second common conductive pad for coupling the second set of pads together.

5. The part as claimed in claim 3, wherein the first common conductive pad and the first set of pads form a first integral, unitary, conductive structure.

6. The part as claimed in claim 4, wherein the first common conductive pad and the first set of pads form a first integral, unitary, conductive structure and the second common conductive pad and the second set of pads form a second integral, unitary, conductive structure.

7. The part as claimed in claim 6, wherein the first and second conductive structures are substantially identical.

8. The part as claimed in claim 1, wherein the first set of pads are interdigitated with the second set of pads.

9. The part as claimed in claim 7, wherein the first and second conductive power traces are substantially identical.

10. The part as claimed in claim 8, wherein the first conductive power trace includes a first set of finger portions, and wherein the second conductive power trace includes a second set of finger portions and wherein the first and second finger portions are interdigitated.

11. An automotive interior plastic part having an anti-vibration and anti-shock support surface capable of wirelessly supplying electrical power to an electrically-powered electronic device supported on the surface, the part comprising:
   first and second sets of conductive, thermoplastic elastomer pads that comprise a first part of the support surface;
   a non-conductive or insulating unitary thermoplastic elastomer substrate chemically bonded to the first and second sets of pads and comprising a second part of the support surface, the substrate electrically insulating the first set of pads from the second set of pads and wherein the pads and the substrate dampen vibration and shock at the support surface and allow power transfer during vehicle motion; and a power source coupling including first and second conductive power traces, the first trace being electrically coupled to each of the first set of pads and the second trace being electrically coupled to each of the second set of pads, the first and second traces forming separate conductive pathways and being operable for biasing the first and second sets of pads at first and second voltage levels, respectively.

12. The part as claimed in claim 11, wherein the first and second sets of pads are sized, shaped and arranged laterally adjacent to each other in a pattern at the support surface in relation to a predetermined distribution of contacts of the device to achieve conductive power transfer to the device at various positions and orientations of the device when supported on the support surface.

13. The part as claimed in claim 11, further comprising a first common conductive pad for coupling the first set of pads together.

14. The part as claimed in claim 13, further comprising a second common conductive pad for coupling the second set of pads together.

15. The part as claimed in claim 13, wherein the first common conductive pad and the first set of pads form a first integral, unitary, conductive structure.

16. The part as claimed in claim 14, wherein the first common conductive pad and the first set of pads form a first integral, unitary, conductive structure and the second common conductive pad and the second set of pads form a second integral, unitary, conductive structure.

17. The part as claimed in claim 16, wherein the first and second conductive structures are substantially identical.

18. The part as claimed in claim 11, wherein the first set of pads are interdigitated with the second set of pads.

19. The part as claimed in claim 17, wherein the first and second conductive power traces are substantially identical.

20. The part as claimed in claim 18, wherein the first conductive power trace includes a first set of finger portions, and wherein the second conductive power trace includes a second set of finger portions and wherein the first and second finger portions are interdigitated.

* * * * *